(12) United States Patent
Aswarthanarayana et al.

(10) Patent No.: US 12,675,542 B1
(45) Date of Patent: Jul. 7, 2026

(54) SYSTEMS AND METHODS FOR PREDICTING TASKS THAT USERS PERFORM ON WEBSITES

(71) Applicant: FMR LLC, Boston, MA (US)

(72) Inventors: Devanga Kotha Aswarthanarayana, Bangalore (IN); Sidhant Pravinkumar Thole, Bangalore (IN); Manish Gupta, Bangalore (IN); Sunil Sharma, Mathura (IN); Sachin Umrao, Bangalore (IN); Bibhash Chakrabarty, Bangalore (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 19/051,498

(22) Filed: Feb. 12, 2025

(51) Int. Cl.
| | |
|---|---|
| *G06F 16/957* | (2019.01) |
| *G06F 16/9535* | (2019.01) |
| *G06F 16/9538* | (2019.01) |
| *G06N 20/00* | (2019.01) |

(52) U.S. Cl.
CPC ...... *G06F 16/9574* (2019.01); *G06F 16/9535* (2019.01); *G06F 16/9538* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 7,827,318 B2 * | 11/2010 | Hinton | ..................... | H04L 63/08 |
| | | | | 709/204 |
| 9,003,441 B1 * | 4/2015 | Jindal | ................. | H04N 21/6547 |
| | | | | 725/35 |
| 2009/0157729 A1 * | 6/2009 | Herlocker | ........... | G06F 16/9535 |
| | | | | 707/999.102 |
| 2016/0364382 A1 * | 12/2016 | Sarikaya | .................. | G06F 40/40 |
| 2023/0076327 A1 * | 3/2023 | Matsuoka | .......... | G06Q 30/0631 |
| 2024/0281834 A1 * | 8/2024 | Woodbeck | ........... | G06V 10/764 |
| 2025/0103662 A1 * | 3/2025 | Gulli | .................. | G06F 16/9535 |

OTHER PUBLICATIONS

Kellar et al, "Using Web Browser Interactions to Predict Task", ACM (Year: 2007).*
Abe, "A Two Stage Prediction Model for Web Page Transition", IDEAS (Year: 2003).*

* cited by examiner

*Primary Examiner* — Amresh Singh
(74) *Attorney, Agent, or Firm* — Cesari and McKenna, LLP

(57) ABSTRACT

Systems and methods are described for predicting tasks that users perform on websites. More specifically, a machine learning model is trained using page session data (that includes page flows which are a sequence of pages visited by a user) for each user that is associated with the website. In addition, the machine learning model is fine-tuned using previous page flows associated with the user, user attribute data that is associated with the user, and user tasks, which are tasks that have been previously completed by the user. When a user visits the website, the machine learning model determines a predicted task after the user visits a predetermined number of webpages. A recommended content is generated based on the predicted task and displayed before the user.

18 Claims, 7 Drawing Sheets

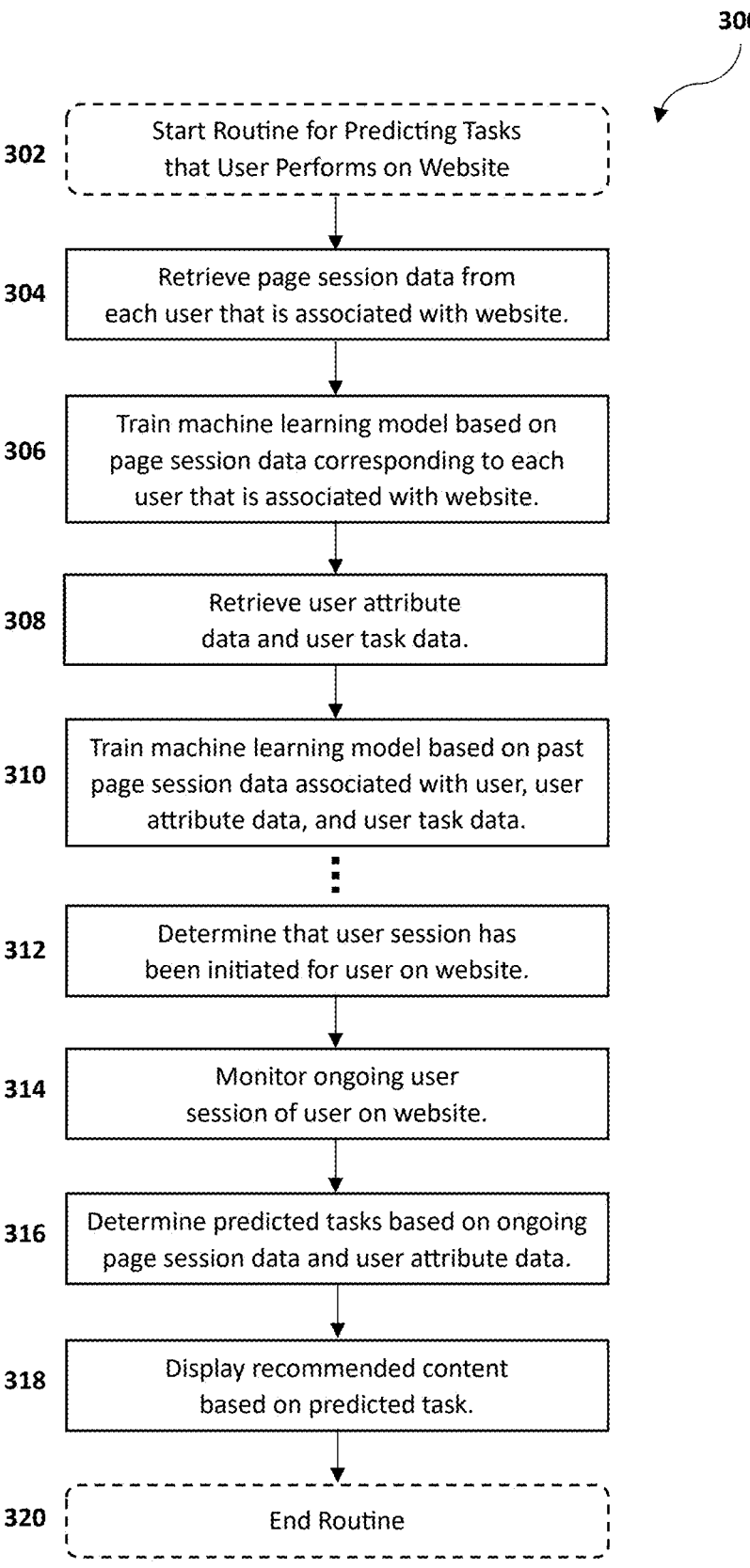

300

302  Start Routine for Predicting Tasks
that User Performs on Website

304  Retrieve page session data from
each user that is associated with website.

306  Train machine learning model based on
page session data corresponding to each
user that is associated with website.

308  Retrieve user attribute
data and user task data.

310  Train machine learning model based on past
page session data associated with user, user
attribute data, and user task data.

312  Determine that user session has
been initiated for user on website.

314  Monitor ongoing user
session of user on website.

316  Determine predicted tasks based on ongoing
page session data and user attribute data.

318  Display recommended content
based on predicted task.

320  End Routine

FIG. 3

| Time | Page Name | Page Code | Source |
|---|---|---|---|
| 4:33:31 PM | fid.com web │customer-service│ contact us standalone | P1 | web |
| 4:34:19 PM | fid.com web │life-events│ inheritance │start the inheritance process | P2 | web |
| 4:34:59 PM | fid.com web │digital│ transition services │notify | P3 | web |
| 4:46:54 PM | fid.com web │digital│ transition services │ confirmation | P4 | web |
| 4:48:42 PM | digital.fidelity.com/ftgw/digital/ste/view/beneficiary | P5 | web |
| 4:50:23 PM | fid.com web │digital│ profile│ profile summary | P6 | web |
| 4:50:26 PM | fid.com web │digital│ trusted-contact│ trusted contact summary | P7 | web |
| 5:00:08 PM | digital.fidelity.com/ftgw/digital/ste/view/beneficiary | P5 | web |
| 5:14:54 PM | digital.fidelity.com/ftgw/digital/ste/txn/beneficiary | P8 | web |
| 5:23:03 PM | digital.fidelity.com/ftgw/digital/ste/view/beneficiary | P5 | web |

FIG. 4A

| Page Session | Page Flows | Tasks |
|---|---|---|
| Session 1 | P3 → P4 → P2 → P7 → P1 | T3, T4 |
| Session 2 | P2 → P5 → P3 → P1 → P2 → P3 | T2, T1, T8 |
| Session 3 | P7 → P4 → P1 → P2 → P3 | T3, T6 |
| Session 4 | P6 → P1 → P7 → P1 → P2 | T5, T7, T9 |

FIG. 4B

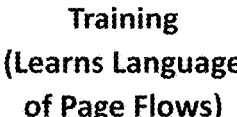

Training
(Learns Language
of Page Flows)

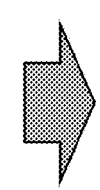

Training Machine Learning Model using
Page Sequences from Different Sessions $P_2\ P_4\ P_1\ ...\ P_n$ $P_3\ P_5\ P_2\ ...\ P_m$ $P_{10}\ P_{12}\ P_{13}\ P_1\ ...\ P_k$

FIG. 5A

Fine-Tuning
(Learns How to
Predict Task)

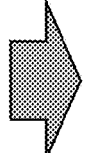

Finetuning to Predict Tasks
Provided Partial Page Flow Sequence $P_2\ P_4\ P_1\ \#\ T_3\ T_4\ <End>$ $P_5\ P_2\ P_9\ P_1\ \#\ T_2\ T_1\ T_8\ <End>$ $P_1\ P_{16}\ P_9\ P_{29}\ P_6\ P_{32}\ \#\ T_{23}\ <End>$

FIG. 5B

Inference
(Predicts Tasks for
Users on Website)

Predict Tasks Using Machine Learning
Model During Inference Time $P_{78}\ P_{67}\ P_{56}\ P_{25}\ \#\ ...\ ?$

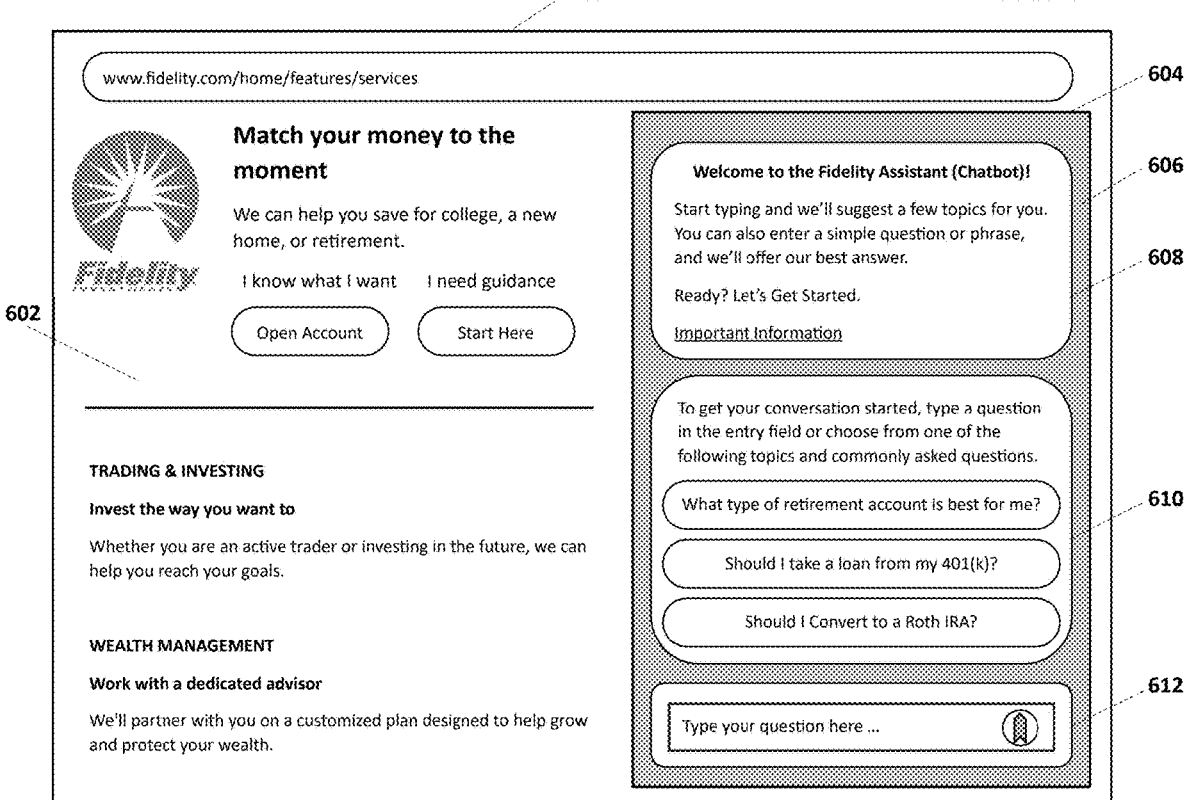

604 www.fidelity.com/home/features/services

Match your money to the moment

We can help you save for college, a new home, or retirement.

I know what I want  I need guidance

Open Account  Start Here

602

TRADING & INVESTING

Invest the way you want to

Whether you are an active trader or investing in the future, we can help you reach your goals.

WEALTH MANAGEMENT

Work with a dedicated advisor

We'll partner with you on a customized plan designed to help grow and protect your wealth.

606

Welcome to the Fidelity Assistant (Chatbot)!

Start typing and we'll suggest a few topics for you. You can also enter a simple question or phrase, and we'll offer our best answer.

Ready? Let's Get Started.

Important Information

608

To get your conversation started, type a question in the entry field or choose from one of the following topics and commonly asked questions.

What type of retirement account is best for me?

Should I take a loan from my 401(k)?

Should I Convert to a Roth IRA?

610

Type your question here ...

612

SYSTEMS AND METHODS FOR PREDICTING TASKS THAT USERS PERFORM ON WEBSITES

TECHNICAL FIELD

This application relates generally to systems and methods, including computer program products, for predicting tasks that users perform on websites.

BACKGROUND

It is usually the objective of most digital platforms (e.g., websites) to enhance user experience via increased personalization. The notion is that personalization causes users to access the digital platform more often because the content on the digital platform becomes more engaging and relevant to the user. Likewise, forecasting tasks to recommend content (e.g., purchasing products or services) may save the user time thereby increasing the user's likelihood of frequently accessing the digital platform as a result of the efficiency that it affords the user. Nevertheless, forecasting user tasks is conventionally considered to be a classification problem that can be solved by using machine learning models that are trained to classify one or more input data to a specific class or category. However, there are limitations in the classification machine learning model due to issues such as the multi-label problem (in which an input can belong to multiple classes or categories simultaneously), skewed task category distribution, etc. Because of such limitations, the tasks predicted according to conventional machine learning models are usually inferior. As such, there remains a need for a method or system that is capable of forecasting user tasks on a digital platform accurately.

SUMMARY

The present disclosure, in one aspect, features a computing system for predicting tasks that a user performs on a website, the system comprising a server computing device having a memory for storing computer-executable instructions and a processor that executes the computer-executable instructions to: train a machine learning model, at a first stage, based on one or more page session data corresponding to users who have previously accessed the website, wherein each page session data includes one or more page flows, each page flow being a sequence of webpages on the website that have been accessed in a single user session, and wherein the one or more page session data is obtained from one or more databases associated with the website; train the machine learning model, at a second stage, wherein the machine learning model is trained based on page session data, of the one or more page session data, that is associated with the user, user attribute data, and user task data, and wherein the user attribute data and the user task data are obtained from the one or more databases associated with the website; and determine, by the machine learning model, in response to an initiation of a user session based on a request from a user to access the website, one or more predicted tasks after a predetermined number of pages on the website have been accessed by the user in the user session, wherein the one or more predicted tasks are determined based on at least one of the predetermined number of pages and the one or more user attributes.

During the first stage, the machine learning model interprets each webpage, that is associated with a corresponding page flow of the one or more page flows, as a lexical token and is trained to determine a page embedding for each lexical token. During the second stage, the machine learning model is fine-tuned to determine predicted tasks by attempting to correctly determined a task that is associated with a training page flow based on a partial sequence of webpages in the training page flow. The computer executable instructions cause the processor to perform further operations to: generate one or more recommended content items based on the one or more predicted tasks, wherein the one or more recommended content items are displayed before the user on a page of the website that is currently being accessed by the user. The page of the website that is currently being accessed by the user is generated by modifying the page, wherein the modification of the page includes rearranging one or more existing content items on the page to accommodate the one or more recommended content items. The page of the website that is currently being accessed by the user includes a chatbot, and the chatbot includes an input section to receive queries from the user, an output section to display a response to the queries, and a recommended content section that includes the one or more recommended content items. The recommended content items in the recommended content section are each associated with a query that was generated or extracted based on a corresponding predicted task of the one or more predicted tasks.

The present disclosure, in another aspect, features a non-transitory computer-readable medium including computer-executable instructions that, when executed by a computing device, causes the computing device to: train a machine learning model, at a first stage, based on one or more page session data corresponding to users who have previously accessed the website, wherein each page session data includes one or more page flows, each page flow being a sequence of webpages on the website that have been accessed in a single user session, and wherein the one or more page session data is obtained from one or more databases associated with the website; the machine learning model, at a second stage, wherein the machine learning model is trained based on page session data, of the one or more page session data, that is associated with the user, user attribute data, and user task data, and wherein the user attribute data and the user task data are obtained from the one or more databases associated with the website; and determine, by the machine learning model, in response to an initiation of a user session based on a request from a user to access the website, one or more predicted tasks after a predetermined number of pages on the website have been accessed by the user in the user session, wherein the one or more predicted tasks are determined based on at least one of the predetermined number of pages and the one or more user attributes.

The computer executable instructions cause the computing device to perform further operations to: extract, in real time, a plurality of accessed webpages that have been accessed by the user within a predetermined time period. The machine learning model determines at least one predicted task after an end of the predetermined time period, wherein the at least one predicted task is determined by the machine learning model based on the plurality of accessed webpages. The computer executable instructions cause the computing device to perform further operations to: determine one or more accessed webpages of the plurality of accessed webpages, the one or more accessed webpages being a subset of the plurality of accessed webpages, wherein the machine learning model determines at least one predicted task after an end of the predetermined time period, and wherein the at least one predicted task is determined by the machine learning model based on the one or more accessed webpages. The computer executable instructions cause the computing device to perform further operations to: retrieve trend data corresponding to one or more trends associated with completing tasks by other users at predetermined time intervals, wherein the trend data corresponds to trends identified over a predetermined period of time; and train the machine learning model based on the trend data, wherein the predicted task is determined based in part on the trend data. Each page on the website includes a page identifier that is mapped to one or more tasks, and wherein the machine learning model determines the predicted task based on a sequence of page identifiers corresponding to the one or more predetermined number of pages. The user task data includes one or more tasks that have been previously completed by the user on the website.

The present disclosure, in a further aspect, features a computerized method for predicting tasks that a user performs on a website, the method comprising: training a machine learning model, at a first stage, based on one or more page session data corresponding to users who have previously accessed the website, wherein each page session data includes one or more page flows, each page flow being a sequence of webpages on the website that have been accessed in a single user session, and wherein the one or more page session data is obtained from one or more databases associated with the website; training the machine learning model, at a second stage, wherein the machine learning model is trained based on page session data, of the one or more page session data, that is associated with the user, user attribute data, and user task data, and wherein the user attribute data and the user task data are obtained from the one or more databases associated with the website; and determining, by the machine learning model, in response to an initiation of a user session based on a request from a user to access the website, one or more predicted tasks after a predetermined number of pages on the website have been accessed by the user in the user session, wherein the one or more predicted tasks are determined based on at least one of the predetermined number of pages and the one or more user attributes.

Each page session data further includes, for each page flow, a time corresponding to when each webpage in the page flow was accessed, and a page identifier associated with each webpage in the page flow. The page session data is stored in a page sessions database, the user attribute data is stored in a user attributes database, and the user task data is stored in a user tasks database. The user attribute data includes at least one of demographics, employment, income, assets, academic achievements, licenses, physical address, bank accounts, and financial accounts. The machine learning model is at least one of a language model and a large language model (LLM). The user session is initiated when the user logs onto an account on the website that is associated with the user, and the user session expires when the user logs off the account or when the user is inactive on the website for a predetermined period of time.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is a flow diagram of a computerized method for predicting tasks that a user performs on a website.

FIG. 4A is an example diagram of a table indicating an example of a page session which includes information regarding webpages that have been visited by the user.

FIG. 4B is an example diagram of a table indicating an example of tasks that have been predicted based on page flows in page sessions associated with user sessions.

FIG. 5A is an example diagram illustrating how a machine learning model is trained to predict next page using page flows, according to some embodiments.

FIG. 5B is an example diagram illustrating how a machine learning model may be fine-tuned to accurately predict tasks using a partial page flow, according to some embodiments.

FIG. 5C is an example diagram illustrating how a machine learning model predicts tasks that a user performs on a website, according to some embodiments.

FIG. 6 is an example diagram illustrating a user interface displaying a webpage of a website that includes recommended content that was generated based on a predicted task.

DETAILED DESCRIPTION

Figure 1:
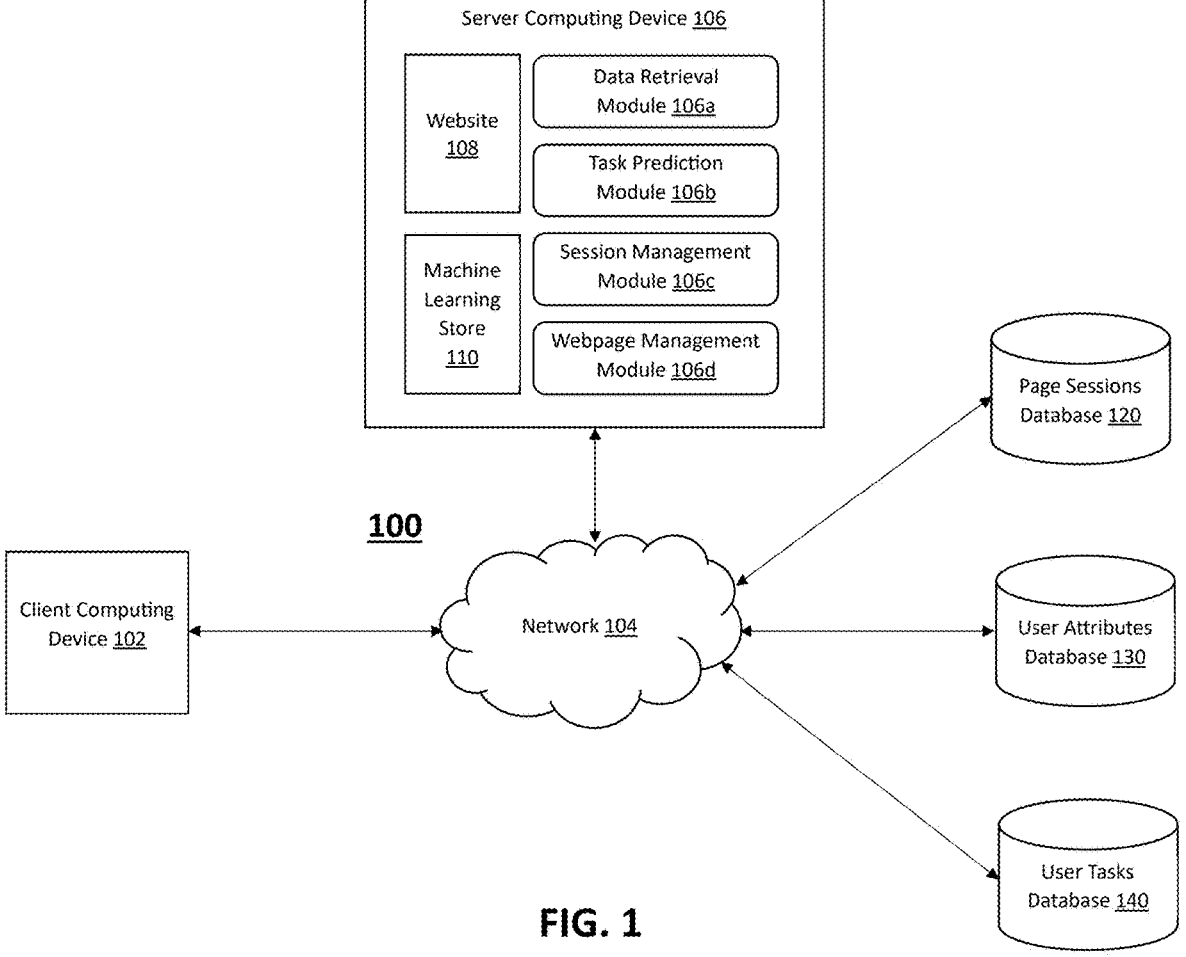
FIG. 1 is a block diagram of a system for predicting tasks that a user performs on a website.

In describing preferred embodiments illustrated in the drawings, specific terminology is employed herein for the sake of clarity. However, this disclosure is not intended to be limited to the specific terminology so selected and it is to be understood that each specific element includes all technical equivalents that operate in a similar manner. In addition, a detailed description of known functions and configurations is omitted from this specification when it may obscure the inventive aspects described herein.

Various tools are discussed herein to facilitate the invention(s) disclosed herein. It should be appreciated by those skilled in the art that any one or more of such tools may be embedded in the application and/or in any of various other ways, and thus while various examples are discussed herein, the inventive aspects of this disclosure are not limited to such examples described herein.

FIG. 1 is a block diagram of a system for 100, which includes a client computing device 102, a server computing device 106, a page sessions database 120, user attributes database 130, and a user tasks database 140, all of which are capable of communicating with each other via a communication network 104.

The client computing device 102 can be coupled to a display device (not shown), such as a monitor, display panel, or screen. For example, client computing device 102 can provide a graphical user interface (GUI) via the display device to a user of corresponding device that presents output resulting from the methods and systems described herein and receives input from the user for further processing. Further, the client computing device 102, may include one or more applications that provide additional functionality to the client computing device 102. For example, the client computing device 102 may include a browser application that allows access to the services provided by devices on system 100, via a website (e.g., website 108), which can be reached by entering a uniform resource locator (URL). Exemplary client computing device 102 includes but is not limited to desktop computers, laptop computers, tablets, mobile devices, smartphones, smart watches, Internet-of-Things (IoT) devices, and internet appliances. It should be appreciated that other types of client computing devices that are capable of connecting to components of the system 100 can be used without departing from the scope of invention. Although FIG. 1 depicts a single client computing device 102, it should be appreciated that system 100 can include any number of client computing devices 102.

The communication network 104 can be a local area network, a wide area network, a cellular network, or any type of network such as an intranet, an extranet (for example, to provide controlled access to external users, for example through the Internet), a private or public cloud network, the Internet, etc., or a combination thereof. In addition, the communication network 104 preferably uses TCP/IP (Transmission Control Protocol/Internet Protocol), but other protocols such as SNMP (Simple Network Management Protocol) and HTTP (Hypertext Transfer Protocol) can also be used. In some embodiments, the communication network 104 is comprised of several discrete networks and/or sub-networks (e.g., cellular to Internet).

The server computing device 106 is a device including specialized hardware and/or software modules that execute on a processor and interact with memory modules of the server computing device 106, to transmit data to other components of the system 106, and to receive data from other components of the system 100, as described herein. The server computing device 106 includes several systems, frameworks, stores, and computing modules that execute on one or more processors of the server computing device 106. For example, the server computing device 106 includes a data retrieval module 106a, a task prediction module 106b, a session management module 106c, a webpage management module 106d, a website 108, and a machine learning store 110 (which can store all types of machine learning models, such as classification type machine learning model(s), regression type machine learning model(s), support vector machines (SVM) machine learning model(s), ensemble method machine learning model(s), neural network model(s), recurrent neural networks (e.g., long short term memory), deep learning model(s), or (large) language model(s)).

Although the data retrieval module 106a, the task prediction module 106b, the session management module 106c, the webpage management module 106d, the website 108, and the machine learning store 110 are shown in FIG. 1 as executing within the same server computing device 106, in some embodiments the functionality of the data retrieval module 106a, the task prediction module 106b, the webpage management module 106c, the user interface module 106d, the website 108, and the machine learning store 110 can be distributed among a plurality of server computing devices. As shown in FIG. 1, the server computing device 106 allows the data retrieval module 106a, the task prediction module 106b, the webpage management module 106c, the user interface module 106d, the website 108, and the machine learning store 110 to communicate with each other in order to exchange data for the purpose of performing the described functions.

It should be appreciated that any number of computing devices, arranged in a variety of architectures, resources, and configurations (e.g., cluster computing, visual computing, cloud computing) can be used without departing from the scope of the invention. Exemplary functionality of the data retrieval module 106a, the task prediction module 106b, the webpage management module 106c, the user interface module 106d, the website 108, and the machine learning store 110 are described in detail below.

The page sessions database 120 may be a computing device (or, in some embodiments, may be a set of computing devices) that is configured to provide, receive, and store various types of data associated with one or more page sessions that correspond to one or more users who, for example, have visited the website 108 or are registered with the website 108 (e.g., user is associated with a login account on the website). Each page session data (e.g., corresponding to a page session) includes a page flow that is associated with the webpages that the user has visited on the website 108. For example, the page flow may include the sequence of pages that have been displayed to a user in a page session.

In some embodiments, the page session may commence with the user logging into the website, in which a login session begins. In other embodiments, the page session may commence when a user first visits the website 108 (e.g., first time visiting or after period of inactivity). In some embodiments, the page session may end with the user logging off the login session. It should be noted that the user may log off the login session voluntarily (e.g., user clicks on logoff button) or involuntarily (e.g., user is inactive on the website for a predetermined time period). In other embodiments, the page session may end when it is detected that the user has been inactive on the website 108 for a predetermined period of time.

The user attribute database 120 may be a computing device (or, in some embodiments, may be a set of computing devices) that is configured to provide, receive, and store various types of data associated with user attributes. For example, the user attribute database 120 may store user attribute data for each user that is registered with the website 108 (e.g., via a login account). In another example, the user attribute database 120 may store user attribute data for each user that visits the website 108 (e.g., information obtained from cookies or server logs). User attribute data may include, but is not limited to, demographics (e.g., age, gender, nationality, ethnicity, religion), employment, income, assets, academic achievements, licenses, physical address, bank accounts, financial accounts (e.g., types of accounts (e.g., individual retirement account (IRA), health spending account (HSA)), total amount in account(s) invested with financial organization, etc.), etc. In some embodiments, the user attribute data is obtained when the user provides personal information (e.g., user attributes) in order to register with the website 108 to obtain a login account.

The user tasks database 140 may be a computing device (or, in some embodiments, may be a set of computing devices) that is configured to provide, receive, and store various types of data associated with user tasks. For example, the website 108 may allow the user to perform or complete one or more tasks (e.g., purchasing a product, making a transaction, registering for courses at a university, etc.). In some embodiments, a task completion may be detected based on the occurrence of a specific event that is associated with the task (e.g., task event). In other embodiments, a task completion may be detected based on a webpage with which the user is provided (e.g., task of purchasing product is determined to be completed with the user is shown the order confirmation webpage). More specifically, one or more webpages of the website 108 may be associated with a task identifier, which may assist in determining whether a task has been completed.

Figure 2:
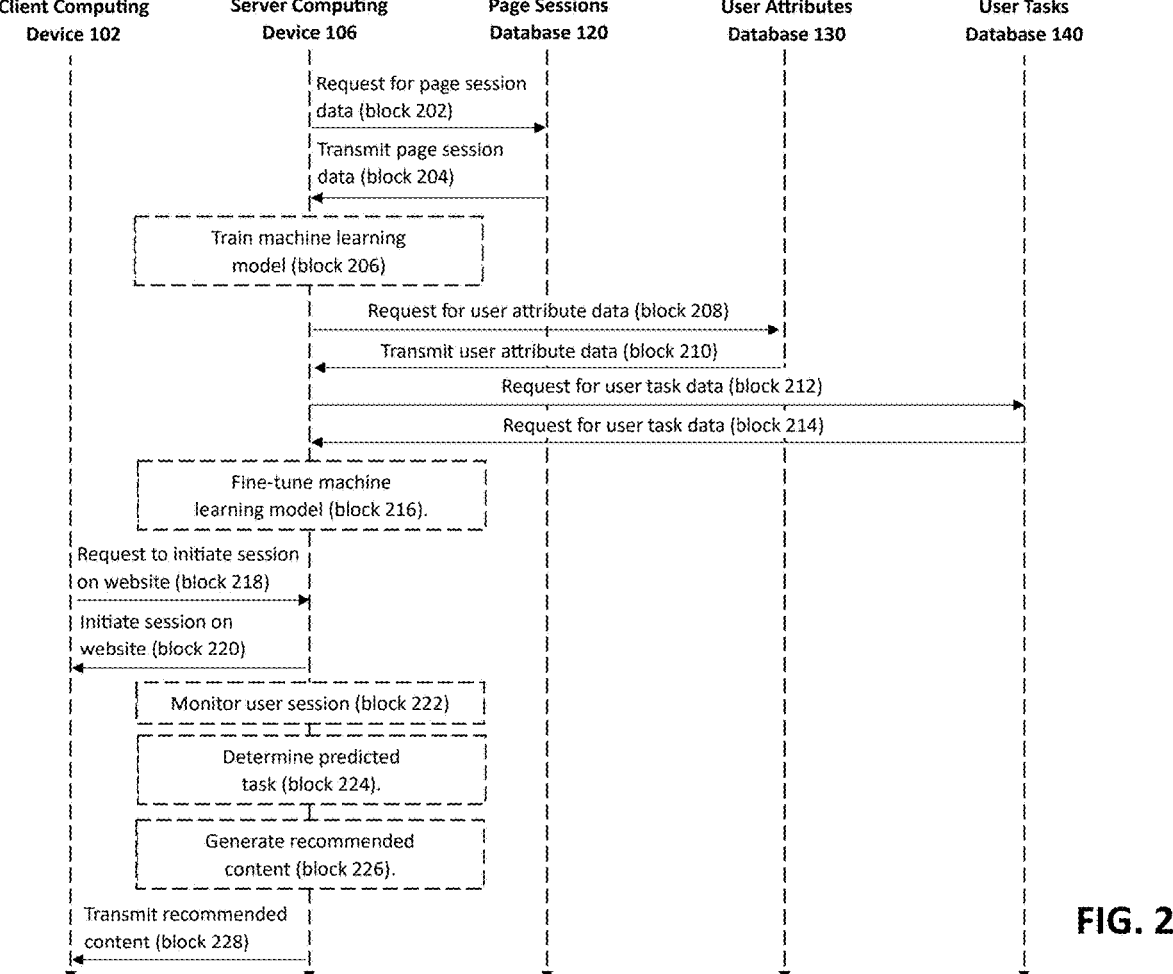
FIG. 2 is a system flow diagram for predicting tasks that a user performs on a website.

FIG. 2 illustrates an exemplary flow diagram corresponding to the system 100 of FIG. 1, in which the client computing device 102, the server computing device 106, the page sessions database 110, the user attributes database 120, and the user tasks database 130, communicate with each other to perform one or more actions. At block 202, the server computing device 106 transmits a request for page session data to the page sessions database 120. At block 204, in response to the request for page session data, the page sessions database 120 transmits the page session data to the server computing device 106. At block 206, the server computing device 106 uses the page session data to train a machine learning model (e.g., a machine learning model that is configured to predict user tasks on a website after being trained). It should be noted that the page session data may include the page session data for each (or every) user that has ever visited the website 108.

At block 208, the server computing device 106 transmits a request for user attribute data that is associated with the user. In response, at block 210, the user attributes database 130 transmits user attribute data to the server computing device 106. At block 212, the server computing device 106 transmits a request for user task data that is associated with the user. In response, at block 214, the user tasks database 140 transmits user task data to the server computing device 106. At block 216, the server computing device 106 fine-tunes the machine learning model using the page session data that is associated with the user, the user attribute data that is associated with the user, and the user task data that is associated with the user. For example, the page session data that is associated with the user may have been previously obtained from the page sessions database 120 (e.g., at block 204).

After an indeterminate period of time, at block 218, the server computing device 106 may receive a request to initiate a user session (e.g., user visiting a website or logging into a user account that is registered with the website). In response, at block 220, the server computing device 106 transmits a confirmation to the client computing device 102 indicating that a user session has been initiated according to the request (e.g., the server computing device 106 may transmit the web page corresponding to the URL in the request or may transmit a confirmation that the login has been successfully performed due to verified credentials provided by the user).

In some embodiments, the server computing device 106 may also store or publish the website 108. However, it should be noted that the server computing device 106 may not necessarily store or publish the website 108. In other words, the website 108 may be stored or published on another server computing device (e.g., a website publishing server computing device). The server computing device 108 may interact with the website publishing server computing device (e.g., via network 104) to facilitate different actions.

At block 222, the server computing device 106 monitors the user session while the user is visiting one or more webpages on the website. More specifically, the server computing device 106 may register or record the webpages that the user has visited during such user session. At block 224, the server computing device 106 causes the machine learning model to determine a predicted task based on the webpages that the user has visited during the user session. At block 226, the server computing device 106 generates recommended content based on the predicted task. At block 228, the server computing device 106 transmits the recommended content to the client computing device 102.

Example Routine for Predicting Tasks that User Performs on Website

Figure 7:
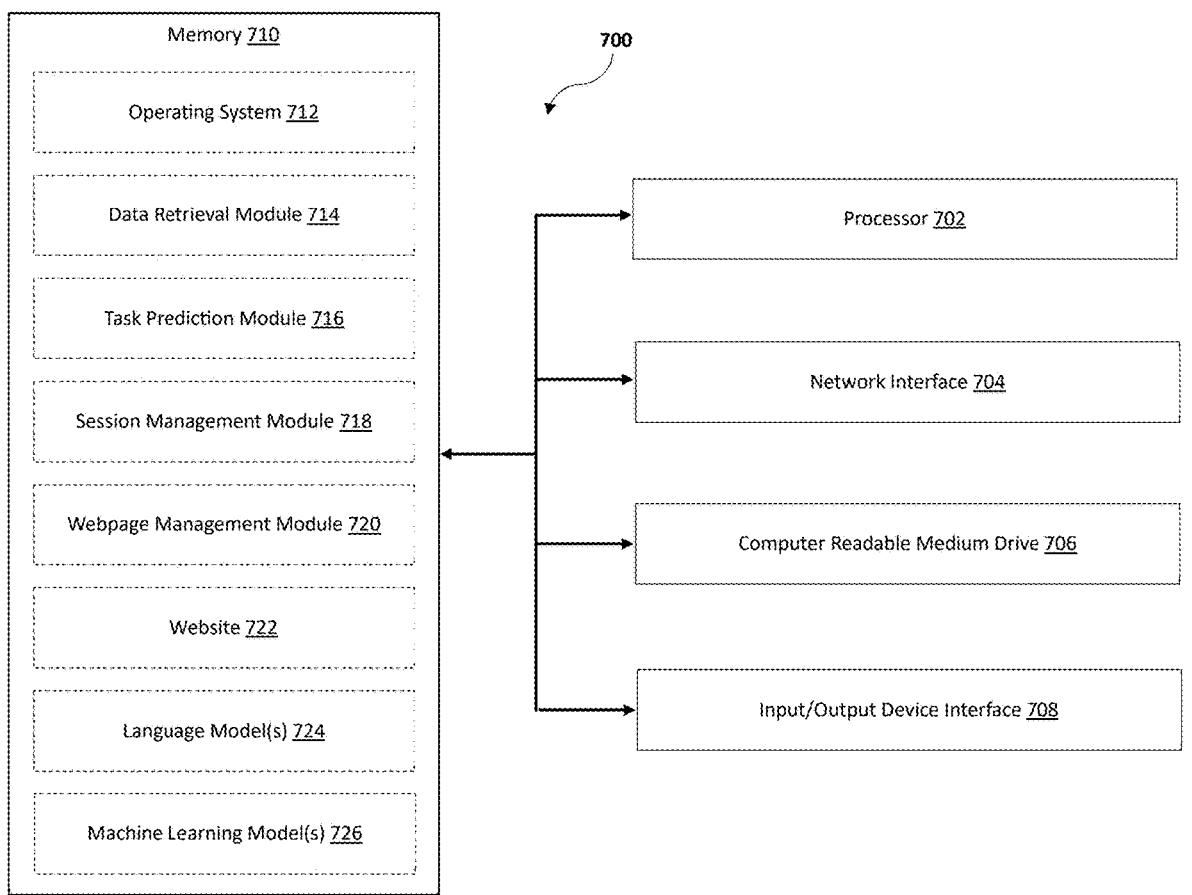
FIG. 7 is a diagram of an illustrative computing system.

When a routine described herein (i.e., 300) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 700 shown in FIG. 7, and executed by one or more processors. In some embodiments, the routine 300 or portions thereof may be implemented on multiple processors, serially or in parallel.

FIG. 3 illustrates example routine 300 (beginning at block 302) for predicting tasks that users perform on a website, that is performed, for example, by the server computing device 106. At block 304, the data retrieval module 106a of the server computing device 106 retrieves page session data from each user that is associated with the website 108. More specifically, the data retrieve module 106a may transmit a request to a page sessions database 120 to obtain the page session data. In response, the page sessions database 120 may transmit the page session data to the server computing device 106, where the page session data may be received by the data retrieval module 106a.

The website 108 may be stored or published on the server computing device 106. The website 108 may include one or more webpages that each may be a document that includes content (e.g., text, images, video, audio, etc.). In addition, the webpage may also include one or more graphical control elements. A graphical control element may be a component on the webpage with which the user is capable of interacting. For example, a graphical control element may include at least one of a button, widget, and icon. For example, the button may include a hyperlink (e.g., in the form of a uniform resource locator (URL)) that, when activated, causes the user to be taken to another webpage of the same or different website. It should be noted that a webpage may include multiple hyperlinks, each of which may bring the user to another webpage of the same or different website. In another example, a graphical control element may also include at least one of text fields (e.g., for inputting texts to, for example, search on a search engine), and option selectors (e.g., checkboxes, radio buttons, drop-down lists, sliders).

Further, it should also be noted that the webpage may also include a chatbot, which may be a software application or web interface that is configured to simulate human conversation through text or voice interactions. In some embodiments, the webpage may include a first section and a second section, in which the chatbot is disposed in the second section. The chatbot may operate using a machine learning model, such as a language model or a large language model (LLM) or may operate using a generative artificial intelligence (AI) model. Further, the chatbot may include an input section and an output section, in which the user may input text (e.g., a question or query) into the input section and may receive a response from the chatbot in the output section. For example, the chatbot may be a guide or virtual assistance that assists users in navigating the website or providing answers to questions that users have regarding the different tasks that the user is capable of performing on the website. In some embodiments, the chatbot is capable of continuing the conversation with the user even if the user has moved to another webpage within the same website.

The webpages may be created using at least one of Hypertext Markup Language (HTML), Cascading Style Sheets (CSS), and JavaScript. Each webpage of the website can be accessed independently by inputting a uniform resource locator (URL) into a web browser. A web browser is a software application that allows users to access (e.g., view) webpages. The web browser may be included on a client computing device (e.g., 102) of a user, in which the web browser provides a user interface to which the user can view the web pages upon having the user input the URL into the web browser. More specifically, after receiving the URL, the web browser sends a request (e.g., via a network, such as the internet) to the server computing device (e.g., 106), associated with such URL, that stores or publishes the website. In reply to such request, the server computing device may transmit a response that may include at least one of HTML, CSS, Javascript code, images, audio, video, etc. The web browser interprets the HTML, CSS, and JavaScript code to generate the webpage.

As discussed previously, a user may be associated with the website 108. In other words, the user may be a visitor to the website (e.g., browsing) or may be registered with the website (e.g., have a login account). As such, whenever the user accesses the website (e.g., by logging in or by inputting the corresponding URL or using a hyperlink from another website, such as a search engine), the website 108 determines that a user session has commenced. The user session may end, for example, when the user has been inactive for a predetermined time period or user logs off the user session. It should be noted that during a user session, the user may view one or more webpages that are associated with the website.

A page session is associated with each user session. The page session may include a page flow that indicates a sequence of web pages that the user has visited within the corresponding user session. An example of a page session data corresponding to a page session of a particular user session of a specific user is shown in FIG. 4A, in which the page session data includes webpage information for each webpage in the page flow, such as the page name (e.g., the URL of the page), the time at which the user accessed the page, the page identifier (e.g., page code) that is associated with each page, and the source of the page (e.g., web). As shown, the page flow of the webpages in the page session data is in sequence according to time (e.g., from the first webpage accessed to the last webpage accessed). It should be noted that there may be multiple users that interact with the website (e.g., website 108), and that each user may be associated with one or more user sessions (and by extension one or more page sessions corresponding to the one or more user sessions). As such, in some embodiments, the page session data may include page sessions for each (or every) user that has visited or accessed the website 108 at some point (a user may be associated with one or more page sessions).

At block 306, the task prediction module 106*b* trains a machine learning model based on page session data corresponding to each user that is associated with the website 108. For example, the training of the machine learning model may include two stages, in which the training performed in block 306 may be a first stage of the two stages. In another example, the task prediction module 106*b* may access or obtain a machine learning model from the machine learning store 110. In some embodiments, the machine learning store 110 can store all types of machine learning models, such as classification type machine learning model(s), regression type machine learning model(s), support vector machines (SVM) machine learning model(s), ensemble method machine learning model(s), neural network model(s), deep learning model(s), or (large) language model(s).

More specifically, after receiving the page session data from the page sessions database 120, the data retrieval module 106*a* may transmit the page session data to the task prediction module 106*b*. In turn, the task prediction module 106*b* may use the page session data to train the machine learning model. As discussed previously, the page session data may include, for each user session, at least one of a page flow including one or more webpages in sequence, the time in which each webpage of the page flow was accessed, the page identifier (or page code) that corresponds to each webpage, and a source of each webpage. The machine learning model may, for example, be a language model or a large language model. In some embodiments, the machine learning model or architecture may be of a generative artificial intelligence (AI), such as the various versions of GPT2, ChatGPT, Gemini, CoPilot, Claude, etc.

The machine learning model may be trained to learn from the language of the page flows. In other words, each webpage may be analogous to a word. Likewise, a sentence may be analogous to a page flow. Therefore, the machine learning model may attempt to learn how to predict the next webpage (or next webpages) in the page flow (e.g., compared with predicting the next word or words in a sentence) based on such training. For example, as shown in FIG. 5A, there may be multiple page flows (e.g., "P2, P4, P1 . . . . Pn," "$P_3$, $P_5$, $P_2$ Pm," "$P_{10}$, $P_{12}$, $P_{13}$, $P_1$ . . . . Pk") that each correspond to a page session of a user session. It should be noted that, in some embodiments, with respect to the page session data, the machine learning model may not necessarily learn from the contents of the webpage (e.g., text, images, audio, video, etc.). Instead, the machine learning model may learn from at least one of the sequence of webpages in the page flow, page identifiers (or page codes), task identifiers (or tasks), the time at which each page was accessed and the source of the webpage. In some embodiments, each of the multiple page flows shown in FIG. 5A may correspond to different users who have accessed the website. In other embodiments, each of the multiple page flows shown in FIG. 5B may correspond to the same user has previously accessed the website. As discussed previously, in some embodiments, the page flows used to train the machine learning model correspond to each (or every) user that has visited or accessed the website 108 at some point (a user may be associated with one or more page sessions). The machine learning model may take a subset of a page flow (e.g., "$P_{10}$, $P_{12}$, $P_{13}$") and attempt to predict the next immediate (e.g., subsequent) webpage in the sequence (e.g., "$P_1$").

To facilitate the learning, the machine learning model (or another software application or system) may, upon receipt of the page session data, convert each webpage of the page flow in the page session data into a webpage token (e.g., lexical token), thus producing a sequence of webpage tokens. Next, the machine learning model determines a page embedding to be associated with each webpage token. The page embeddings may be a multidimensional vector that represents a webpage (e.g., a webpage may be represented by a single row or column vector having fifty numbers as elements of the vector).

In some embodiments, the page embeddings are determined by first generating a random page embedding for each webpage token. Next, for each page flow, the machine learning model attempts to predict the next webpage token in sequence. For example, a page flow may include a predetermined number of webpages (e.g., ten webpages). The machine learning model attempts to predict the next page based on a partial sequence corresponding to a subset of the webpages (e.g., first six webpages). The predicted webpage is compared to the correct webpage (e.g., the seventh webpage) based on a loss function. The current embeddings (and/or weights or model parameters) for the relevant webpages are updated based on the results of the loss function. In some embodiments, the machine learning model uses at least one of the time in which each webpage of the page flow was accessed, the page identifier (or page code) that corresponds to each webpage, and the source of each webpage, to predict the next webpage. The machine learning model goes through such a forementioned process until accurate (finalized) page embeddings (and/or weights or model parameters) are generated. For example, the machine learning model may iterate or loop until it no longer improves its accuracy or when an accuracy threshold is reached (e.g., 95% correct). After such training is performed, the machine learning model may be capable of accurately predicting the next webpage using the finalized page embeddings (and/or weights or model parameters).

At block 308, the data retrieval module 106a retrieves user attribute data and user task data. For example, the data retrieval module 106a may transmit a request to the user attributes database 130 to obtain the user attribute data. In response, the user attributes database 130 may transmit the user attribute data to the server computing device 106, where the user attribute data is received by the data retrieval module 106a. It should be noted that, in some embodiments, the user attribute data corresponds to the user (e.g., is personal to the user as opposed to other users). However, it should also be noted that, in some embodiments, the user attributes database 130 may also include user attribute data from other users, but the data retrieval module 106a may to retrieve the user attribute data corresponding to the user. As discussed previously, user attribute data may include, but is not limited to, demographics (e.g., age, gender, nationality, ethnicity, religion), employment, income, assets, academic achievements, licenses, physical address, bank accounts, financial accounts (e.g., types of accounts (e.g., individual retirement account (IRA), health spending account (HSA)), total amount in account(s) invested with financial organization, etc.), etc. In some embodiments, the user attribute data is obtained when the user provides personal information (e.g., user attributes) in order to register with the website 108 to obtain a login account.

In another example, the data retrieval module 106a may transmit a request to the user tasks database 140 to obtain the user task data. In response, the user tasks database 140 may transmit the user task data to the server computing device 106, where the user task data is received by the data retrieval module 106a. As discussed previously, the website 108 may allow the user to perform or complete one or more tasks (e.g., purchasing a product, making a transaction, registering for courses at a university, etc.). In some embodiments, a task completion may be detected based on the occurrence of a specific event that is associated with the task (e.g., task event). In other embodiments, a task completion may be detected based on a webpage with which the user is provided (e.g., task of purchasing product is determined to be completed with the user is shown the order confirmation webpage). Consequently, the user task data includes data on each (or every) task that has been completed by the user on the website 108. It should be noted that, in some embodiments, the user task data corresponds to the user (e.g., is personal to the user as opposed to other users). However, it should also be noted that, in some embodiments, the user tasks database 140 may also include user task data from other users, but the data retrieval module 106a may select to retrieve the user task data corresponding to the user.

It should be noted that, one or more webpages of the website 108 may be associated with a task identifier, which identifies a task that is associated with the webpage. For example, a first page of the website 108 ("fid.com/trade/equity/ng/order confirm") may be mapped to a first task identifier ("$T_1$") that is associated with a first task ("purchasing or selling of common stock"). In another example, a second page of the website 108 ("iphone.fid.com/transact/transfer/mmlanding") may be mapped to a second task identifier ("$T_2$") that is associated with a second task ("money movement"). In some embodiments one or more pages of the website 108 may each be associated with one or more tasks. In some embodiments, one or more pages of the website 108 may not be associated with any tasks. A (mapping) machine learning model that is trained to map tasks with a webpage may be used to perform the mapping between the webpages of the website 108 and one or more tasks. Alternatively, a structure mapping engine (SME) may be used to perform the mapping between the webpages of the website 108 and one or more tasks.

At block 310, the task prediction module 106b trains (or fine-tunes) the machine learning model based on past page session data associated with user, user attribute data, and user task data. For example, as discussed previously, the training of the machine learning model may include two stages, in which the training performed in block 310 may be a second stage of the two stages. As discussed previously with respect to block 304, the data retrieval module 106a may retrieve page session data from the page sessions database 120. Since the page session data includes data from each user that has previously accessed the website 108, the page session data naturally includes data associated with the user. Such past page session data (e.g., page session data associated with the user) may be accessible by the task prediction module 106b. In the case that the page session data is no longer stored by the server computing device 106, the data retrieval module 106a may retrieve the page session data from the page sessions database 130 again (in this case, the data retrieval module 106a may select to obtain the page session data associated with the user and not page session data associated with other users).

Further, the page session data (e.g., page flows) may be mapped (e.g., by the data retrieval module 106a or the task prediction module 106b) to the completed tasks in the user task data (e.g., the page flow that is associated with the completion of a user task). An example of such mapping is shown in FIG. 4B, in which each of the previous sessions (e.g., "Session 1," "Session 2," "Session 3," Session 4") are associated with respective page flows that include one or more webpages identified by their page identifiers or page codes (e.g., "P3→P4→P2→P7→P1," "P2→P5→P3→P1→P2→P3," "P7→P4→P1→P2→P3," "P6→P1→P7→P1→P2"). In turn each page flow is associated with one or more tasks or task identifiers (e.g., "T3, T4," "T2, T1, T8," "T3, T6," "T5, T7, T9"). In some embodiments, after the data retrieval module 106a receives the user attribute data and the user task data, the data retrieval module 106a transmits the user attribute data and the user task data to the task prediction module 106b.

It should be noted that, in some embodiments, with respect to the page session data associated with the user, the machine learning model may not necessarily be fine-tuned from the contents of the webpage (e.g., text, images, audio, video, etc.). Instead, the machine learning model may learn from at least one of the sequence of webpages in the page flow, page identifiers (or page codes), task identifiers (or tasks), the time at which each page was accessed and the source of the webpage.

The training of the task prediction module 106*b* in block 310 may also be considered to be fine-tuning the machine learning model that has been previously trained in, for example, block 306. The notion of fine-tuning may involve retraining the machine learning model on a specific task or dataset, while allowing the machine learning model to retain its previous expertise (e.g., embedding mappings, weights, model parameters, etc.). By fine-tuning the machine learning model, the machine learning model learns new capabilities as well as increases its accuracy in predictions.

An example of fine-tuning is shown in FIG. 5B, in which the machine learning model is provided partial page flows (e.g., "$P_2 P_4 P_1$," "$P_5 P_2 P_9 P_1$," "$P_1 P_{16} P_9 P_{29} P_6 P_{32}$") and is instructed to predict or forecast one or more predicted user tasks based on a corresponding partial page flow. In other words, a partial page flow (e.g., "$P_2 P_4 P_1$,"), instead of its corresponding complete page flow (e.g., "$P_2 P_4 P_1 P_7 P_{11} P_1$,"), may be provided to the machine learning model to assist the machine learning model in predicting a user task with minimal information (e.g., in the form of webpages). This is because, in some embodiments, one of the objectives for fine-tuning the machine learning model may be to have the machine learning model predict the user tasks (e.g., during inference time) well beyond the point in time in which the user is already at the webpage to which the user is to begin or complete the intended user task. In other embodiments, the goal may be to predict the tasks before the user even knows which kind of task that the user wishes to perform. Once the machine learning model generates a prediction (e.g., one or more tasks or task identifiers), the result is compared with the correct user tasks or task identifiers (e.g., "$T_3 T_4$", "$T_2 T_1 T_8$," "$T_{23}$"). The machine learning model may update at least one of its webpage embeddings, weights, and model parameters. In some embodiments, the machine learning model may use the task identifiers (which correspond to respective tasks) that are associated with each webpage in the page flow to assist in determining the predicted tasks. Similar to the previous training with respect to block 306, the machine learning model may iterate or loop until it no longer improves its accuracy or when an accuracy threshold is reached (e.g., 95% correct). It should be noted that, in some embodiments, the training process performed on the machine learning model in first and second stages (e.g., blocks 304, 306, 308, and 310) may be performed offline (e.g., the machine learning model is trained using pre-collected data without real-time updates). More specifically, the machine learning model may not be available (e.g., at inference time) to perform the tasks associated with blocks 312, 314, 316, and 318 (as explained in detail infra) until the machine learning model is completely trained at block 310. Consequently, after completing the second stage of training at block 310 (e.g., fine-tuning the machine learning model), the machine learning model may be connected to the corresponding website to predict tasks and display recommended content (based on the predicted tasks) for the user.

At block 312, the session management module 106*c* of the server computing device 106 may determine that a user session has been initiated for the user on the website 108. For example, such determination in block 312 may be performed after an indeterminate amount of time has passed between block 310 and block 312. As discussed previously, a user may be associated with the website 108. In other words, the user may be a visitor to the website (e.g., browsing) or may be registered with the website (e.g., have a login account). As such, whenever the user accesses the website (e.g., by logging into the account or by inputting the corresponding URL or using a hyperlink from another website, such as a search engine), the website 108 may determine that a user session has commenced.

In some embodiments, as shown in FIG. 1, the website 108 may be stored or published in the server computing device 106. As such, the session management module 106*c* may assist the website 106 in initiating a user session. In other embodiments, the website 108 may be stored in a website server computing device that is a separate device from the server computing device 106. For example, the website server computing device may be disposed at a different location than the server computing device 106. Further, in some embodiments, the website server computing device 106 may be configured to response to users requesting to access the website 108 on the website server computing device 106.

At block 314, the session management module 106*c* monitors the ongoing user session of user on website. In some embodiments, the session management module 106*c* generates and/or monitors (or maintains) the ongoing user session data, which may include ongoing page session data. The ongoing page session data may in turn include at least one of an ongoing page flow that indicates the webpages that the user has visited, the time in which the user has accessed such webpages, the page code associated with the webpages (e.g., page code is an identifier that identifies a respective webpage), and the source of the webpages. The ongoing user session may be the current (or continuous) time period in which the user is actively interacting with the website. For example, the session management module 106*c* may determine whether the user is actively interacting with the website by detecting at least one of activation of graphical control elements on the website, movement of a cursor (e.g., mouse, finger, stylus, etc.), scrolling on the webpage, etc.

The ongoing user session may be over an indefinite time period, in which the user session may end (e.g., expires) after the session management module 106*c* detects that a session expiration event has occurred. For example, the session expiration event may include events in which the user has logged of his or her account on website or may be when the session management module 106*c* detects that the user has not been actively interacting with the website 108 for a predetermined period of time. In some embodiments, in case that the website 108 is published or stored on the website server computing device (instead of the server computing device 106), the session management module 106*c* may cooperate with the website server computing device to monitor the ongoing user session.

When monitoring the ongoing user session, the session management module 106*c* may also store (and continuously update) ongoing page session data (that is associated with the ongoing user session). More specifically, the ongoing page session data may include an incomplete page flow of the webpages to which the user has visited. For example, the incomplete page flow may include one or more webpages that are sequenced according to time. Whenever the user accesses a new webpage, the session management module 106*c* updates the incomplete page flow (and by extension the ongoing page session data) with the new webpage. In case that the user session ends, the session management module 106*c* may determine that the incomplete page flow is now complete (e.g., a complete page flow or completed page session data). In such case, the session management module 106*c* may transmit the page session data to be stored in the page sessions database 120.

It should be noted that the session management module 106*c* may also be aware of the user accessing the website from more than one location. For example, the user may decide to open a new tab (or a new instance of the web browser) on the same device (e.g., client computing device 120) to the website 108. In another example, the user may decide to access the website from a different device at the same time that the user is still interacting with the website 108 on the original device. In yet another example, the user may switch devices, in which the user moves to a new different device. In the aforementioned examples, the session management module 106c may still consider accessing from different locations to be part of the ongoing user session. As a result, the session management module 106c may continuously update the incomplete page flow based on when (e.g., based on time) the webpages were accessed.

The session management module 106c may perform monitoring of the ongoing page session based on how the user interacts with the website 108. For example, in the case that the user is registered with the website 108 (e.g., is associated with a login account), the session management module 106c may monitor the user session via the user's login session. It should be noted that in cases in which the user is not registered with the website 108, the server computing device 106 may monitor the user session of such unregistered user via the use of cookies that may be stored on the client computing device of the unregistered user. Cookies may be, for example, text files that are stored on the client computing device. Cookies are also capable of tracking a user's browsing behavior (e.g., which webpages that the user has visited on the website) and facilitating user session management (e.g., login information, items in shopping cart, etc.). As such, when the unregistered user accesses the website 108, the server computing device 106 may retrieve the cookie from the client computing device of the unregistered user. It should also be noted that, in some embodiments, the server computing device 106 may also continuously store user data (e.g., page session data) regarding the unregistered user without the use of cookies.

At block 316, the task prediction module 106b determines one or more predicted tasks based on ongoing page session data and user attribute data. It should be noted that, in some embodiments, the one or more predicted tasks may be determined to be tasks that a user is going to perform in the immediate future (e.g., 5-10 minutes), is likely to perform in the immediate future, or may be interested in performing in the immediate future. As discussed previously, in some embodiments, the session management module 106c generates and monitors (or maintains) the ongoing user session data, which may include ongoing page session data. The ongoing page session data may in turn include at least one of an ongoing page flow that indicates the webpages that the user has visited, the time in which the user has accessed such webpages, the page code associated with the webpages (e.g., page code is an identifier that identifies a respective webpage), and the source of the webpages. The ongoing user session may be the current (or continuous) time period in which the user is actively interacting with the website 108. As such, an ongoing page session data may be continuously updated based on the webpages that have been visited by the user.

After a predetermined number of webpages has been visited by the user, the task prediction module 106b determines one or more predicted tasks based on the ongoing page session data and user attribute data. In some embodiments, the task prediction module 106b may determine that the current number of webpages is sufficient to determine one or more predicted tasks. As discussed previously with respect to block 308, the data retrieval module 106a may have previously obtained the user attribute data from the user attributes database 130. As such, the user attribute data may be accessible by the task prediction module 106b (and, by extension, the machine learning model). In the case that the user attribute data is no longer stored by the server computing device 106, the data retrieval module 106a may retrieve the user attribute data from the user attributes database 130 again. An example of such determination of predicted tasks is shown in FIG. 5C, in which the machine learning model uses the current webpages in the ongoing page session (e.g., $P_{78}$ $P_{67}$ $P_{56}$ $P_{25}$) to predict one or more tasks.

At block 318, the webpage management module 106d displays recommended content based on the one or more predicted tasks. More specifically, the task prediction module 106b or the webpage management module 106d may generate or determine recommended content based on the one or more predicted tasks. For example, the webpage management module 106d may modify a webpage currently accessed by a user by rearranging one or more existing content items on the webpage to accommodate the one or more recommended content items. More specifically, the webpage may include preexisting content items (e.g., text, images, graphical control elements, etc.). As discussed previously, a graphical control element may be a component on the webpage with which the user is capable of interacting. For example, a graphical control element may include at least one of a button, widget, and icon. For example, the button may include a hyperlink (e.g., in the form of a uniform resource locator (URL)) that, when activated, causes the user to be taken to another webpage of the same or different website. A graphical control element may also include at least one of text fields (e.g., for inputting texts to, for example, search on a search engine), and option selectors (e.g., checkboxes, radio buttons, drop-down lists, sliders). Consequently, the webpage management module 106d may modify the webpage by rearranging the preexisting content items (e.g., text, images, graphical control elements, etc.) to accommodate the recommended content. Such rearrangement may include physically moving one or more of the preexisting content items to, for example, the top of the webpage, the sides of the webpage, or the bottom of the webpage and disposing the recommended content in the middle of the webpage. In another example, the rearrangement may include interweaving the recommended content with the one or more preexisting content items.

Another example of such recommended content is shown in FIG. 6, in which a webpage (e.g., "www.fidelity.com/home/features/services"), currently accessed by the user (e.g., webpage 600), includes a chatbot 606 that may be accessed by the user. For example, the user may be in need of assistance in navigating the website 108, and therefore may access a chatbot 606 that is a feature of the current webpage 600. As discussed previously, a chatbot, may be a software application or web interface that is configured to simulate human conversation through text or voice interactions. As shown in FIG. 6, the current webpage 600 may include a first section 602 and a second section 604, in which contents of the webpage are disposed in the first section 602 and the chatbot 606 is disposed in the second section 604. The chatbot 606 may operate using a machine learning model, such as a language model or a large language model (LLM) or may operate using a generative artificial intelligence (AI) model. Further, the chatbot may include an output section 608 and an input section 612, in which the user may input text (e.g., a question) into the input section 612 and may receive a response from the chatbot in the output section 608. For example, the chatbot 606 may be a guide or virtual assistance that assists users in navigating the website or providing answers to questions that users have regarding the different tasks that the user is capable of performing on the website. In some embodiments, the chatbot 606 is capable of continuing the conversation with the user even if the user has moved to another webpage within the same website 108.

As shown, the chatbot 606 includes a recommended content section 610, which is the location in which the webpage management module 106*d* displays the recommended content (that was determined based on the one or more predicted tasks). In the example shown in FIG. 6, the recommended content is in the form of recommended questions (or queries) for the user. In some embodiments, a recommendation machine learning model (which may include a language model or large language model) may generate or extract the recommended content (e.g., recommended questions or queries) for the user based on the one or more predicted tasks. In this case, the machine learning model may have determined a first predicted task (e.g., user wishes to open up a retirement account), a second predicted task (e.g., user is in need of money), and a third predicted task (e.g., user is wondering how to modify his or her financial account after moving to a state that has no state income tax).

As a result, the recommendation machine learning model may generate based on (or extract from) the first predicted task, the second predicted task, and the third predicted task, a first recommended question (e.g., "What type of retirement account is best for me?"), a second recommended question (e.g., "Should I take a loan from my 401(k)?"), and a third recommended question ("Should I Convert to a Roth IRA?"). As such, the webpage management module 106*d* may display the recommended question or query (which was generated by the recommendation machine learning model based on the one or more predicted tasks that were generated by the machine learning model) on the chatbot 606 to be viewed by the user. It should be noted that by activating one of the first recommended question, second recommended question, or third recommended question may be considered an input by the user. As such, the proper response may be displayed in the output section 608. It should further be noted that the recommended content shown in the recommended content section 610 may be personalized for each user that visits the website. As such, one user may have recommended content that is different from another user. It should be noted that, in some embodiments, the webpage management module 106*d* may modify the webpage to display the recommended content. For example, the webpage may be modified to re-rank content (news, articles, widgets, etc.) based on the task predictions. The routine ends at block 320.

It should be noted that the task prediction module 106*b* may continuously train the machine learning model based on trend data. More specifically, there may be one or more trends that are observed with respect to completing tasks by other users. The trend data may be based on one or more completed tasks that have been completed by other users. Further, each completed task may be associated with one or more webpages. A trend may be observed when a large number of users (e.g., 30% or higher) completes the same (or similar) task with the same or similar set of webpages accessed. For example, the observed trend data may indicate that users (e.g., such as a large number of users) are more likely to perform one or more specific tasks (e.g., "T3", "T17") based on a particular sequence of webpages in a page flow (e.g., "P16", "P37", "P2"). Further, such trend data (associated with such one or more trends) may be stored in the user tasks database 140. As such, a data retrieval module 106*c* may, for example, periodically (over a predetermined time interval) retrieve trend data from the user tasks database 140. In some embodiments, the user tasks database 140 may transmit the trend data automatically at a predetermined time intervals or when there is a new tend observed. As such, the task prediction module 106*b* may train or fine-tune such machine learning model based on the trend data. As a result of such training, the machine learning model may determined predicted tasks based at least one of the ongoing page session data (corresponding to the ongoing page session), the user attribute data, and the trend data.

It should be also noted that, in some embodiments, blocks 314, 316, and 318 may be continuously performed (e.g., the routine 300 loops back to block 314 from block 318) until the user session ends or expires. This is because the user may perform multiple tasks on the website 108, and the machine learning model may attempt to predict each task that the user performs. More specifically, the user may access a set of webpages during the user session. The set of webpages may be divided into page intervals that each include a predetermined number of webpages that are sequenced according to a time in which each of the predetermined number of webpages were accessed by the user. The machine learning model determines at least one predicted task at the end of each page interval.

In some embodiments, a predicted task is determined by the machine learning model based at least in part on each webpage that has been accessed cumulatively by the user since the beginning of the user session (e.g., every webpage that was accessed since the first webpage in the page flow). In other embodiments, the predicted task is determined by the machine learning model based at least in part on each webpage that has been accessed by the user in a current page interval. In other words, the machine learning model may wait until the user accesses or visits a predetermined number of webpages to generate another set of one or more tasks (e.g., the machine learning model predicts a first set of tasks after the user visits a first set of five webpages, then the machine learning model predicts a second set of tasks based on a second set of five webpages (visited immediately and/or subsequently by the user after the first set of five webpages), but not based on the first set of five pages).

In further embodiments, the predicted task is determined by the machine learning model based at least in part on a subset of the webpages that have been accessed by the user in a current page interval. In other words, the machine learning model may first wait until the user accesses or visits a predetermined number of webpages to generate another set of one or more tasks. Then the machine learning model determines the predicted task based on a subset of the webpages corresponding to the predetermined number of pages (e.g., the machine learning model predicts a set of tasks after the user visits ten webpages, but the prediction is made on six webpages of the ten webpages). In other embodiments, it may be possible that the machine learning model incorrectly predicted the incorrect tasks for the user. As such, the machine learning model may continuously attempt to predict the correct tasks with each webpage (or predetermined number of webpages) that the user accesses during the user session.

In yet another embodiment, the predicted task is determined based on at least in part on a first set of accessed webpages (e.g., the first set of accessed webpages including one or more accessed webpages) that have been accessed by the user in a predetermined time period. In other words, the machine learning model may first wait until a predetermined time period has passed (e.g., 1 minute, 10 minutes, 15 minutes, 20 minutes, etc.). Next, the machine learning model may, in real-time extract or receive one or more accessed webpages that correspond to the predetermined time period (thereby forming the first set of accessed webpages). For example, real-time may correspond to an action that is performed within milliseconds so that result of such actions is available virtually immediately (e.g., within milliseconds). In this case, the machine learning model is capable of extracting (or receiving) the one or more accessed webpages milliseconds after the predetermined time period has ended. After obtaining the one or more accessed webpages, the machine learning model predicts a set of tasks based on the first set of accessed webpages.

In yet a further embodiment, the predicted task is determined based on at least in part on a second set of accessed webpages which may be a subset of the first set of accessed webpages. For example, the first set of accessed webpages may include eleven webpages (e.g., P1, P2, . . . , P10, P11; sequenced according to time accessed, from earliest to latest) that have been accessed within a time period of ten minutes. As such, the second set of accessed webpages may be a predetermined number of accessed webpages of the first set of accessed webpages. For example, the second set of accessed webpages may include five of the eleven accessed webpages of the first set of accessed webpages. In a further example, each of the accessed webpages in the first set of accessed webpages may be ordered sequentially based on time (e.g., when the user accessed each of the accessed webpages). Consequently, the five accessed webpages in the second set of accessed webpages may correspond to the last (e.g., most recent) accessed webpages (when sequenced according to time from earliest to latest) in first set of accessed webpages (e.g., P7, P8, P9, P10, P11).

It should be further noted that the machine learning model in the present disclosure outperforms the conventional machine learning model that uses the classification approach to forecast user tasks. For example, the machine learning model was able to predict at least one task that was eventually performed by the user, 80% of the time. In contrast, the conventional machine learning model predicted at least one task that was eventually performed by the user, 48% of the time. In another example, the machine learning model was able to predict all tasks that were eventually performed by the user 48% of the time. In contrast, the conventional machine learning model predicted all tasks that were eventually performed by the user, 9% of the time. In a further example, the machine learning model was able to predict at least one task that was in the minority class, 38% of the time. In contrast, the conventional machine learning model predicted at least one task that was in the minority class 0.6% of the time. In yet another example, the percentage of all actual tasks predicted by the machine learning model was 64% of the time. In contrast, the percentage of all actual tasks predicted by the conventional machine learning model was 27% of the time.

Execution Environment

FIG. 7 illustrates various components of an example computing device 900 configured to implement various functionality described herein.

In some embodiments, the computing device 700 may be implemented using any of a variety of computing devices, such as server computing devices, desktop computing devices, personal computing devices, mobile computing devices, mainframe computing devices, midrange computing devices, host computing devise, or some combination thereof.

In some embodiments, the features and services provide by the computing device 700 may be implemented as webs services consumable via one or more communication networks. In further embodiments, the computing device 700 is provided by one or more virtual machines implemented in a hosted computing environment. The hosted computing environment may include one or more rapidly provisioned and released computing resources such as computing devices, networking devices, and/or storage devices. A hosted computing environment may also be referred to as a "cloud" computing environment.

In some embodiments, as shown, a computing device 700 may include one or more processors 702, such as physical central processing units ("CPUs"); one or more network interfaces 704, such as network interface cards ("NICs"); one or more computer readable medium drives 706, such as a high density disk ("HDDs"), solid state drives ("SSDs"), flash drives, and/or other persistent computer readable media; one or more input/output drive interfaces 708; and one or more computer-readable memories 710, such as random access memory ("RAM") and/or other volatile non-transitory readable media.

The one or more computer-readable memories 710 may include computer program instructions that one or more computer processors 702 execute and/or data that the one or more computer processors 702 use in order to implement one or more embodiment. For example, the one or more computer-readable memories 710 can store an operating system 712 to provide general administration of the computing device 700. As another example, the one or more computer-readable memories 710 can store a data retrieval module 714 (e.g., data retrieval module 106a) for retrieving data from one or more databases. In a further example, the one or more computer-readable memories 710 can store a task prediction module 716 (e.g., task prediction module 106b) for determining one or more predicted tasks. In yet another example, the one or more computer-readable memories 710 can store a session management module 718 (e.g., session management module 106c), which manages (or monitors) a user session on a website (e.g., website 722 or website 108).

In yet a further example, the one or more computer-readable memories 710 can store a webpage management module 720 (e.g., webpage management module 106d), which may generate and display recommended content based on one or more predicted tasks generated by the task prediction module 716 (e.g., task prediction module 106b). In a further example, the one or more computer-readable memories 710 can store a website 722 (e.g., website 108), which may include one or more webpages that are accessible via a uniform resource locator (URL). In another example, the one or more computer-readable memories 710 can store a (large) language model(s) 724 for processing natural language input and generating natural language output (e.g., machine learning store 110). In yet another example, the one or more computer-readable memories 710 can store machine learning model(s) other than a language model or a large language model (e.g., models stored or included in (large) language model(s) 724), such as classification type machine learning model(s), regression type machine learning model(s), support vector machines (SVM) machine learning model(s), ensemble method machine learning model(s), neural network model(s), recurrent neural networks (e.g., long short term memory), deep learning model(s).

Terminology

The term "model," as used in the present disclosure, can include computer-based models of any type and of any level of complexity, such as any type of sequential, functional, or concurrent model. Models can further include various types of computation models, such as, for example, artificial neural networks ("NN"), language models (e.g., large language models ("LLMs")), artificial intelligence ("AI") models, machine learning ("ML") models, multimodal (e.g., models or combinations of models that can accept inputs of multiple modalities, such as images and text), and/or the like.

A Language Model is any algorithm, rule, model, and/or other programmatic instructions that can predict the probability of a sequence of words. A language model may, given a starting text string (e.g., one or more words), predict the next word in the sequence. A language model may calculate the probability of different word combinations based on the patterns learned during training (based on a set of text data from books, articles, websites, audio files, etc.). A language model may generate many combinations of one or more next words (and/or sentences) that are coherent and contextually relevant. Thus, a language model can be an advanced artificial intelligence algorithm that has been trained to understand, generate, and manipulate language. A language model can be useful for natural language processing, including receiving natural language prompts and providing natural language response based on the text on which the model is trained. A language model may include n-gram, exponential, positional, neural network, and/or other types of models.

A Large Language Model ("LLM") is any type of language model that has been trained on a larger data set and has a larger number of training parameters compared to a regular language model. An LLM can understand more intricate patterns and generate text that is more coherent and contextually relevant due to its extensive training. Thus, an LLM may perform well on a wide range of topics and tasks. An LLM may comprise an NN trained using self-supervised learning. An LLM may be of any type, including a Question Answer ("QA") LLM that may be optimized for generating answers from a context, a multimodal LLM/model, and/or the like. An LLM (and/or other models of the present disclosure), may include, for example, attention-based and/or transformer architecture or functionality.

While certain aspects and implementations are discussed herein with reference to use of a language model, LLM, and/or AI, those aspects and implementations may be performed by any other language model, LLM, AI model, generative AI model, generative model, ML model, NN, multimodal model, and/or other algorithmic process. Similarly, while certain aspects and implementations are discussed herein with reference to use of a ML model, those aspects and implementations may be performed any other AI model, generative AI model, generative model, NN, multimodal model, and/or other algorithmic processes.

In various implementations, the LLMs and/or other models (including ML models) of the present disclosure may be locally hosted, cloud managed, accessed via one or more Application Programming Interfaces ("API's"), and/or any combination of the foregoing and/or the like. Additionally, in various implementations, the LLMS and/or other models (including ML models) of the present disclosure may be implemented in or by electronic hardware such application-specific processors (e.g., application-specific integrated circuits ("ASICs")), programmable processors (e.g., field programmable gate arrays ("FPGAs")), application-specific circuitry, and/or the like. Data that may be queried using the systems and methods of the present disclosure may include any type of electronic data, such as text, files, documents, books, manuals, emails, images, audio, video, databases, metadata, positional data (e.g., geo-coordinates), geospatial data, sensor data, web pages, time series data, and/or any combination of the foregoing and/or the like. In various implementations, such data may comprise model inputs and/or outputs, model training data, modeled data, and/or the like.

Examples of models, language models, and/or LLMs that may be used in various implementations of the present disclosure include, for example, Bidirectional Encoder Representations from Transformers (BERT), LaMDA (Language Model for Dialogue Applications), PaLM (Pathways Language Model), PaLM 2 (Pathways Language Model 2), Generative Pre-trained Transformer 2 (GPT-2), Generative Pre-trained Transformer 3 (GPT-3), Generative Pre-trained Transformer 4 (GPT-4), LLAMA (large Language Model Meta AI), and BigScience Large Open-science Open-access Multilingual Language Model (BLOOM).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus (e.g., a programmable processor, a computer, and/or multiple computers). A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry (e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like). Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data (e.g., magnetic, magneto-optical disks, or optical disks). A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices (e.g., DRAM, SRAM, EPROM, EEPROM, and flash memory devices); magnetic disks (e.g., internal hard disks or removable disks); magneto-optical disks; and optical disks (e.g., CD, DVD, HD-DVD, and Blu-ray disks). The processor and the memory can be supplemented by and/or incorporated in special purpose logic circuitry.

To provide for interaction with a user, the above-described techniques can be implemented on a computing device in communication with a display device (e.g., a CRT (cathode ray tube), plasma, or LCD (liquid crystal display) monitor, a mobile device display or screen, a holographic device and/or projector, for displaying information to the user and a keyboard and a pointing device (e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback (e.g., visual feedback, auditory feedback, or tactile feedback; and input from the user can be received in any form, including acoustic, speech, and/or tactile input).

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computing system for predicting tasks that a user performs on a website, the system comprising a server computing device having a memory for storing computer-executable instructions and a processor that executes the computer-executable instructions to:

train a machine learning model, at a first stage, based on page session data corresponding to each of one or more users who have previously accessed the website, wherein the page session data includes one or more page flows, each page flow being a sequence of webpages on the website that have been accessed in a single user session, and wherein, during the first stage, each webpage in a page flow is interpreted as a lexical token and the machine learning model is trained to generate a page embedding for each lexical token based upon co-occurrence within page flows;

train the machine learning model, at a second stage, based on the page session data that is associated with the user, user attribute data, and user task data, and wherein the second stage comprises fine-tuning the machine learning model to predict a task associated with a training page flow using only a partial sequence of webpages from the training page flow;

determine, by the machine learning model, during an ongoing user session and prior to completion of a task, one or more predicted tasks after a predetermined number of pages on the website have been accessed by the user in the user session, wherein the one or more predicted tasks are determined based on at least one of the predetermined number of pages and the user attribute data; and generate one or more recommended content items based on the one or more predicted tasks, wherein the recommended content items are displayed to the user on a page of the website that is currently being accessed by the user and wherein the recommended content items are generated independently of an explicit user approval to create a task record.

2. The computing system of claim 1, wherein the page of the website that is currently being accessed by the user is generated by modifying the selected page, wherein the modification of the page includes rearranging one or more existing content items on the page to accommodate the one or more recommended content items.

3. The computing system of claim 1, wherein the page of the website that is currently being accessed by the user includes a chatbot, and wherein the chatbot includes an input section to receive queries from the user, an output section to display a response to the queries, and a recommended content section that includes the one or more recommended content items.

4. The computing system of claim 3, wherein the recommended content items in the recommended content section are each associated with a query that was generated or extracted based on a corresponding predicted task of the one or more predicted tasks.

5. The computing system of claim 1, wherein interpreting each webpage as a lexical token comprises mapping each webpage to a discrete page identifier representing the webpage within the machine learning model.

6. The computing system of claim 5, wherein the discrete page identifier is derived from at least one of a URL, a canonicalized URL, a page hash, or an internal page reference.

7. The computing system of claim 5, wherein the page embedding is generated based on observed transitions between discrete page identifiers within page flows.

8. The computing system of claim 1, wherein the partial sequence of webpages excludes at least one webpage associated with completion of the predicted task.

9. The computing system of claim 8, wherein the predicted task is determined prior to user interaction with a webpage that initiates execution of the task.

10. A non-transitory computer-readable medium including computer-executable instructions that, when executed by a computing device, causes the computing device to:

train a machine learning model, at a first stage, based on page session data corresponding to each of one or more users who have previously accessed the website, wherein the page session data includes one or more page flows, each page flow being a sequence of webpages on the website that have been accessed in a single user session, and wherein, during the first stage, each webpage in a page flow is interpreted as a lexical token and the machine learning model is trained to generate a page embedding for each lexical token based upon co-occurrence within page flows;

train the machine learning model, at a second stage, based on the page session data that is associated with the user, user attribute data, and user task data, and wherein the second stage comprises fine-tuning the machine learning model to predict a task associated with a training page flow using only a partial sequence of webpages from the training page flow;

determine, by the machine learning model, during an ongoing user session and prior to completion of a task, one or more predicted tasks after a predetermined number of pages on the website have been accessed by the user in the user session, wherein the one or more predicted tasks are determined based on at least one of the predetermined number of pages and the user attribute data; and generate one or more recommended content items based on the one or more predicted tasks, wherein the recommended content items are displayed to the user on a page of the website that is currently being accessed by the user and wherein the recommended content items are generated independently of an explicit user approval to create a task record.

11. The non-transitory computer-readable medium of claim 10, wherein the computer executable instructions cause the computing device to perform further operations to:

extract, in real time, a plurality of accessed webpages that have been accessed by the user within a predetermined time period.

12. The non-transitory computer-readable medium of claim 11, wherein the machine learning model determines at least one predicted task after an end of the predetermined time period, wherein the at least one predicted task is determined by the machine learning model based on the plurality of accessed webpages.

13. The non-transitory computer-readable medium of claim 11, wherein the computer executable instructions cause the computing device to perform further operations to:

determine one or more accessed webpages of the plurality of accessed webpages, the one or more accessed webpages being a subset of the plurality of accessed webpages, wherein the machine learning model determines at least one predicted task after an end of the predetermined time period, and wherein the at least one predicted task is determined by the machine learning model based on the one or more accessed webpages.

14. The non-transitory computer-readable medium of claim 10, wherein the computer executable instructions cause the computing device to perform further operations to:

retrieve trend data corresponding to one or more trends associated with completing tasks by other users at predetermined time intervals, wherein the trend data corresponds to trends identified over a predetermined period of time; and train the machine learning model based on the trend data, wherein the predicted task is determined based in part on the trend data.

15. The non-transitory computer-readable medium of claim 10, wherein each page on the website includes a page identifier that is mapped to one or more tasks, and wherein the machine learning model determines the predicted task based on a sequence of page identifiers corresponding to the one or more predetermined number of pages.

16. The non-transitory computer-readable medium of claim 10, wherein the user task data includes one or more tasks that have been previously completed by the user on the website.

17. A computerized method for predicting tasks that a user performs on a website, the method comprising:

training a machine learning model, at a first stage, based on page session data corresponding to each of one or more users who have previously accessed the website, wherein the page session data includes one or more page flows, each page flow being a sequence of webpages on the website that have been accessed in a single user session, and wherein, during the first stage, each webpage in a page flow is interpreted as a lexical token and the machine learning model is trained to generate a page embedding for each lexical token based upon co-occurrence within page flows;

training the machine learning model, at a second stage, based on the page session data that is associated with the user, user attribute data, and user task data, and wherein the second stage comprises fine-tuning the machine learning model to predict a task associated with a training page flow using only a partial sequence of webpages from the training page flow;

determining, by the machine learning model, during an ongoing user session and prior to completion of a task, one or more predicted tasks after a predetermined number of pages on the website have been accessed by the user in the user session, wherein the one or more predicted tasks are determined based on at least one of the predetermined number of pages and the user attribute data; and generating one or more recommended content items based on the one or more predicted tasks, wherein the recommended content items are displayed to the user on a page of the website that is currently being accessed by the user and wherein the recommended content items are generated independently of an explicit user approval to create a task record.

18. The method of claim 17, wherein the page session data further includes, for each page flow, a time corresponding to when each webpage in the page flow was accessed, and a page identifier associated with each webpage in the page flow.

* * * * *